United States Patent
Koreki et al.

(10) Patent No.: US 10,025,558 B2
(45) Date of Patent: Jul. 17, 2018

(54) MODULE DIVISION ASSISTANCE DEVICE, MODULE DIVISION ASSISTANCE METHOD, AND MODULE DIVISION ASSISTANCE PROGRAM

(71) Applicant: Hitachi, Ltd., Chiyoda-ku, Tokyo (JP)

(72) Inventors: Genta Koreki, Tokyo (JP); Daisuke Fukui, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/504,515

(22) PCT Filed: Dec. 11, 2014

(86) PCT No.: PCT/JP2014/082884
§ 371 (c)(1),
(2) Date: Feb. 16, 2017

(87) PCT Pub. No.: WO2016/092677
PCT Pub. Date: Jun. 16, 2016

(65) Prior Publication Data
US 2017/0242661 A1    Aug. 24, 2017

(51) Int. Cl.
G06F 7/52 (2006.01)
G06F 7/72 (2006.01)
G06F 17/30 (2006.01)

(52) U.S. Cl.
CPC ........ G06F 7/721 (2013.01); G06F 17/30675 (2013.01)

(58) Field of Classification Search
CPC ................... G06F 7/721; G06F 17/30675
(Continued)

(56) References Cited

U.S. PATENT DOCUMENTS 4,445,177 A * 4/1984 Bratt .................... G06F 8/41
                                                    712/245
5,809,500 A * 9/1998 Nolan .................... G06F 8/78
(Continued)

FOREIGN PATENT DOCUMENTS

JP    2001-290639 A    10/2001
JP    2004-295425 A    10/2004
JP    2007-219586 A     8/2007

OTHER PUBLICATIONS

International Search Report (PCT/ISA/210) issued in PCT Application No. PCT/JP2014/082884 dated Jan. 20, 2015 with English-language translation (two (2) pages).
(Continued)

Primary Examiner — Tan V. Mai
(74) Attorney, Agent, or Firm — Crowell & Moring LLP

(57) ABSTRACT

Provided are a module division assistance device, a module division assistance method, and a module division assistance program for automatically extracting a divisible module by utilizing information relating to a function used by a module. A keyword obtaining unit of an information processing device collects data relating to a function used by a module into keyword use data organized by modules, and a data analysis unit uses the data and a calculation method for an indivisibility calculation item specified by a user and stored in an indivisibility calculation item list, thereby calculating an indivisibility, and stores the indivisibility into indivisibility data. Then, with respect to a module to be subjected to division determination, a module division determination unit compares the indivisibility relating to a function relevant to the indivisibility calculation item specified by the user with a threshold value stored in the indivisibility calculation item list, thereby determining whether the module can be divided or not.

15 Claims, 13 Drawing Sheets

(58) Field of Classification Search
USPC .......................................................... 708/650
See application file for complete search history.

(56) References Cited

U.S. PATENT DOCUMENTS

| | | | | |
|---|---|---|---|---|
| 5,818,952 A * | 10/1998 | Takenouchi | ....... | G06K 9/00442 |
| | | | | 382/101 |
| 7,617,210 B2 * | 11/2009 | Lew | .................. | G06F 17/30539 |
| 9,182,947 B2 * | 11/2015 | Koul | ..................... | G06F 3/0481 |

OTHER PUBLICATIONS

Japanese-language Written Opinion (PCT/ISA/237) issued in PCT Application No. PCT/JP2014/082884 dated Jan. 20, 2015 (three (3) pages).

* cited by examiner

Fig. 3

KEYWORD CATEGORY TABLE (212)

| FACULTY NAME | KEYWORD |
|---|---|
| COMMUNICATION | SCI0 |
| | SCI1 |
| | ... |
| TIMER | ITU |
| | CMT |
| | ... |
| ... | ... |

| | COMMUNICATION | | TIMER | | ... |
|---|---|---|---|---|---|
| 4001 | SCI0 | SCI1 | ITU | CMT | ... |
| FUNCTION A | 4 | 2 | 3 | 2 | ... |
| FUNCTION B | 0 | 0 | 0 | 1 | ... |
| FUNCTION C | 11 | 0 | 0 | 3 | ... |
| FUNCTION D | 0 | 1 | 1 | 0 | ... |
| ... | ... | ... | ... | ... | ... |

KEYWORD UTILIZING DATA EVERY FUNCTION — 213
3002, 3001, 4002

Fig. 5

INDIVISIBILITY CALCULATION ITEM LIST 214

| # | ITEM | CALCULATION METHOD | THRES- HOLD VALUE |
|---|---|---|---|
| 1 | CONCERNING DEGREE OF FACULTY | CONCERNING DEGREE OF FACULTY A AND FACULTY B = NUMBER OF FUNCTION UTILIZING KEYWORD BELONGING TO FACULTY A AND KEYWORD BELONGING TO FACULTY B / NUMBER OF FUNCTION UTILIZING KEYWORD BELONGING TO FACULTY A OR KEYWORD BELONGING TO FACULTY B | 0.7 |
| 2 | RATIO OF UTILIZING ORDER OF FACULTY | RATIO ACCORDING TO WHICH FACULTY B IS UTILIZED AFTER FACULTY A = NUMBER OF FUNCTION UTILIZING FACULTY B AFTER FACULTY A / NUMBER OF FUNCTION UTILIZING FACULTY B AFTER FACULTY A OR UTILIZING FACULTY A AFTER FACULTY B | 0.5 |
| ... | ... | ... | ... |

INDIVISIBILITY DATA — 215

| | | COMMUNICATION | | TIMER | | ... |
|---|---|---|---|---|---|---|
| | | SCI0 | SCI1 | ITU | CMT | ... |
| COMMUNICATION | SCI0 | — | | 0.8 | | ... |
| | SCI1 | | | | | ... |
| TIMER | ITU | | | — | | ... |
| | CMT | 0.8 | | | | ... |
| ... | ... | ... | ... | ... | ... | ... |

3002 — COMMUNICATION
3001 — TIMER
6001

VIEWPOINT OF TABLE

| | | CATEGORY B | |
|---|---|---|---|
| | | KEYWORD B1 | KEYWORD B2 |
| CATEGORY A | KEYWORD A1 | CONCERNING DEGREE OF FACULTY | |
| | KEYWORD A2 | | |

Fig. 7

| # | ITEM | THRESHOLD VALUE |
|---|---|---|
| | FUNCTION NARROWING DOWN JUDGEMENT LIST | |
| 1 | USING FACULTY/KEYWORD NUMBER | 3 |
| 2 | FACULTY/MAXIMUM NUMBER OF SPACE BETWEEN LINES EXISTING BETWEEN KEYWORDS | 3 |
| 3 | LOC | 10 |
| 4 | COMPLEX DEGREE | 30 |
| 5 | CORRECTION NUMBER OF TIMES | 4 |
| 6 | PERIOD ELAPSED FROM LAST CORRECTION | 10 DAYS |
| 7 | NUMBER OF PEOPLE CONCERNING DEVELOPMENT | 5 |
| ... | ... | |

Fig. 13
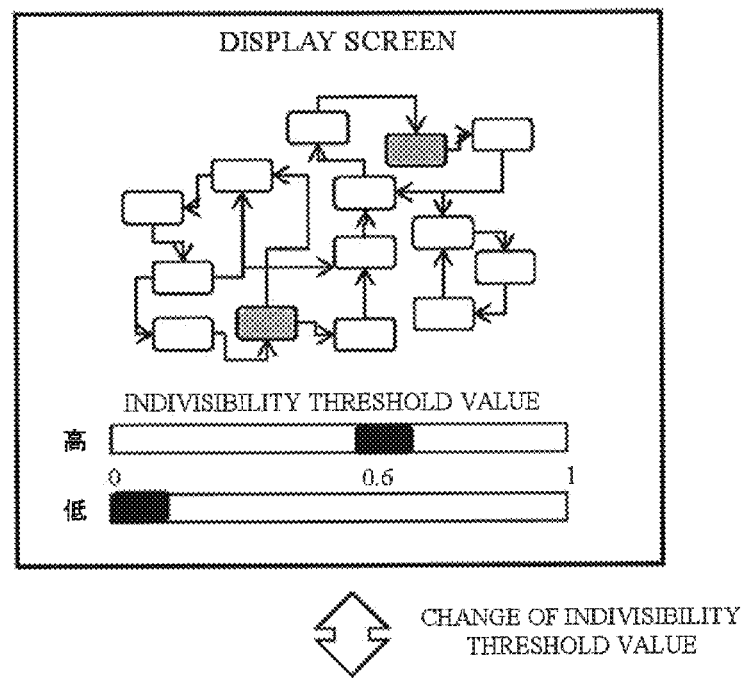
CHANGE OF INDIVISIBILITY THRESHOLD VALUE
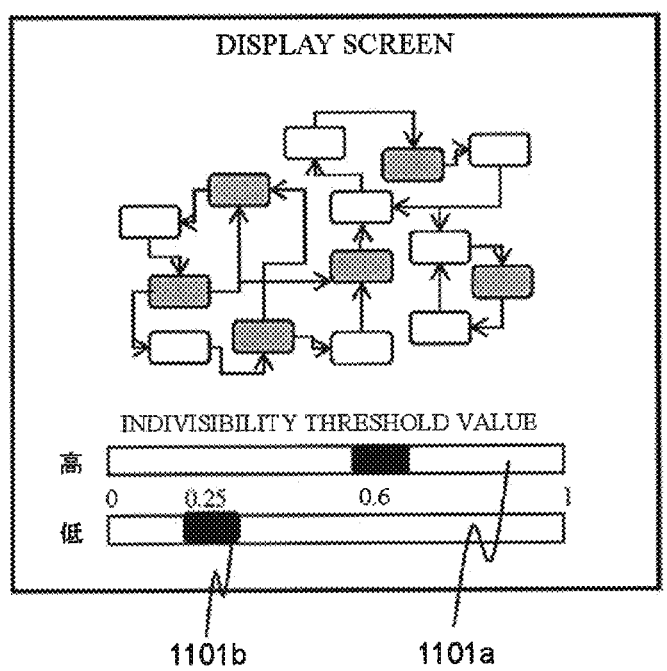

MODULE DIVISION ASSISTANCE DEVICE, MODULE DIVISION ASSISTANCE METHOD, AND MODULE DIVISION ASSISTANCE PROGRAM

TECHNICAL FIELD

The present invention relates to a module division assistance device, a module division assistance method and a module division assistance program, through which it is judged whether a module within a source code, for example function division can be conducted or not.

BACKGROUND ART

It has been conventionally known a case that a function is arranged in an inappropriate file due to that a file is not appropriately designed, thus this becomes a cause to drop source readability. In PTL 1, it is disclosed a method to judge whether or not a function becoming an object to be judged should be separated from a file by utilizing an evaluation rule of function (resemblance degree of function name and so on included in a file).

CITATION LIST

Patent Literature

PTL 1: Japanese Patent Application Laid-Open No. 2007-219586

SUMMARY OF INVENTION

Technical Problem

However, in the method disclosed in the PTL 1, since analysis is not conducted within the function, it cannot be judged whether the function is divisible or not, therefore source readability cannot be improved in the function level.

Solution to Problem

In order to dissolve the above problem, a module visualization judgement of the present invention includes following means.

According to one aspect of the present invention, it can be provided a module division assistance method for dividing a module (for example, bundle of faculties•elements such as function, variable, macro and the like) in source code by utilizing an input device, an output device, an arithmetic device and a storage device or a device to realize such method and a program.

The arithmetic device can utilize a keyword category table and an indivisibility calculation item list stored in the storage device or input from the input device. The keyword category table includes a keyword and a plurality of combinations of data combination relating to the category corresponding to the keyword. For example, as the category, the faculty relating to the keyword can be utilized. In a case that a part having the same or relating faculty is gathered up in one file if possible, readability of source code is improved. Therefore, when the keywords are classified while paying attention to the faculty, the source code can be easily arranged. Alternatively, the keywords themselves may be utilized as the category. In this case, the keyword and the category are correspond one to one. Although more detailed analysis can be done, there will be a case that examination of the result becomes complicated. Further, the category may be hierarchized in more than 2.

The indivisibility calculation item list includes a combination of the indivisibility calculation item between the first category and the second category among categories and the information relating to the calculation method of the indivisibility calculation item. As for the indivisibility calculation item and the calculation method thereof, various rules can be established based on law learned by experience.

The arithmetic device includes a source code obtaining unit, a keyword obtaining unit, a data analysis unit and a module division judgment unit.

The source code obtaining unit obtains a group of source codes or source code becoming the visualizing object, which are stored in the storage device or input from the input device. The keyword obtaining unit specifies the keyword included in the module every module in the group of source codes and makes the keyword utilizing data every module. The keyword utilizing data every module are made by statistically adding up association among keywords, the association appearing in the module of group of source codes. Although statistical precision of the group of source codes is improved according that data quantity becomes more and more, data processing quantity becomes large. Further, it is desirable that the group of source codes becomes gathering having big association with the source code becoming visualizing object. As typical example, it is desirable that database to which the source code becoming visualizing object belongs or gathering of the source code belonging to a project is utilized as the group of source codes.

The data analysis unit calculates the indivisibility for the first category and the second category by utilizing the calculation method stored in the indivisibility calculation item list, the data stored in the keyword utilizing data every module and the information concerning the category corresponding to the keyword included in the keyword category table, and makes indivisibility data.

According to the above process by the source code obtaining unit and the data analysis unit, the indivisibility of category aspect each other relating to the keyword is compiled into database as the indivisibility data.

The module division judgement unit specifies the keyword existing within each module in the source code becoming visualizing object and further specifies the module having a keyword group corresponding to the first category and the second category with indivisibility lower than a predetermined threshold value. The thus specified module becomes a candidate to examine division thereof.

Here, the main constituent or the information processing device to compile the indivisibility data into the database may be another main constituent or the information processing device to judge module division.

In the preferred example of the present invention, in a case that faculty is utilized as category, the data analysis unit calculates concerning degree of the first faculty and the second faculty or ratio of utilizing order of the first faculty and the second faculty, as the indivisibility.

As for the threshold value, an operator can input it from the input device in each time. In this case, a result changing the threshold value can be confirmed in real time. Alternatively, it is conceivable that the threshold value is accompanied beforehand to the group of each information in the indivisibility calculation item list.

The category for the keyword included within the module in the source code becoming visualizing object is not necessarily limited to two and there is case that the category number is more than three. In this case, when all of indivisibilities among categories corresponding to the keyword included in some module are lower than the predetermined threshold value, it may be judged that such module is divisible module. In such module, it is guessed that many parts without association are included, thus it will be desirable that division is examined with precedence.

In the preferred example of the present invention, to narrow down the module in the source code becoming visualizing object, it can be utilized a module narrowing down judgement list in which narrowing down condition is defined. The module division judgment unit conducts a process specifying the module corresponding to the narrowing down condition, thereby processing amount can be reduced. As the narrowing down condition, various conditions can be established by experience. As a concrete example of the module narrowing down condition, it can be utilized many conditions such as number of utilizing faculty or keyword, maximum number of spaces between lines concerning faculty or keyword, LOC (Lines Of Code), complexity degree measurable by various indexes, correction number of times, time lapsed from the last correction, number of people engaging with development, or developing level, experience and ability of developers and the like.

In more concrete example, there are provided the module narrowing down item ruling the narrowing down condition in order to narrow down the module division judgement objective module and the module narrowing down judgement data describing the threshold value for module narrowing down every item. The data analysis unit calculates the value to narrow down the module according to the module narrowing down item, and compares the value to narrow down the module with the threshold value for module narrowing down. When the value to narrow down the module is larger than the threshold value for module narrowing down, the module division judgement is conducted. When the value to narrow down the module is lower than the threshold value for module narrowing down, it may be constructed that the module division judgement is not done.

Here, a plurality of threshold values utilized for the module division judgement may be used and various judgement conditions can be combined. For example, even in the module judged as divisible module based on only one threshold value, there is a case that a plurality of groups having faculty with high indivisibility separately exist in such module. In another preferred example, the module division judgement unit has faculty to extract the group having faculty with high indivisibility and to judge indivisibility of groups having faculty with high indivisibility. Therefore, it is conceivable: when indivisibility between groups is lower than the predetermined threshold value, it is judged as divisible module and it is not judged as divisible module in other cases.

Further, according to another aspect of the present invention, it is provided the source code obtaining unit for obtaining the source code becoming visual object and the keyword obtaining unit for obtaining the keyword described in the source code or source code concerning a project to which the source code is belongs or developing maintenance data. Further, it is utilized the keyword category table in which the keyword described in the module or the faculty name to which the keyword belongs are gathered up. Furthermore, it is utilized the keyword utilizing data every module in which the keyword obtaining unit stores data concerning the keyword utilizing every module obtained while referring the keyword category table. Further, it is utilized the indivisibility calculation item list in which the indivisibility item of faculty or keyword, the calculation method of indivisibility and the threshold values are gathered up. Further, it is utilized the data analysis unit which calculates the indivisibility by using the indivisibility data in which calculation values of indivisibility calculation item are stored, the keyword utilizing data every module and the indivisibility calculation method described in the in divisibility calculation item list and stores the calculated result in the indivisibility data. Further, it is provided the module division judgement unit which compares the indivisibility with the threshold value obtained from the indivisibility calculation item list or the threshold value input by a user and conducts division judgement of the module.

The device construction described in the above may be constructed from a simple computer or may be constructed from another computer in which voluntary parts of the input device, the output device, the processing device and the storage device are connected through network. The concept of the invention in both constructions is mutually equivalent, thus same each other.

In the present example, the function equivalent to the function constructed from the software can be realized from the hardware such as FPGA (Field Programmable Gate Array), ASIC (Application Specific Integrated Circuit) and the like. Such embodiment is included within the scope of the present invention.

Advantageous Effects of Invention

According to the present invention, indivisibility of the faculty is calculated by utilizing information concerning the faculty which the module uses against the module included within the source code and it is judged whether the module is divisible or not by using indivisibility. Thereby, source readability improvement can be assisted at the module level. The problems, constructions and effects other than those described in the above will be cleared by description of following embodiments.

BRIEF DESCRIPTION OF DRAWINGS

FIG. 3 is a table figure indicating an example of keyword category table in Example.

FIG. 4 is a table figure indicating an example of keyword utilizing data every function in Example.

FIG. 5 is a table figure indicating an example of indivisibility calculation item list in Example.

FIG. 6 is a table figure indicating an example of indivisibility data in Example.

FIG. 7 is a table figure indicating an example of function narrowing down judgement list.

FIG. 13 is a plan view of an example in which visualization view changes corresponding to indivisibility change.

DESCRIPTION OF EMBODIMENTS

Hereinafter, one embodiment concerning a function division assistance device, a function division assistance method and a function division assistance program will be described with reference to the drawings.

However, the present invention is not construed while limiting to contents of description of the embodiment explained hereinafter. Within the scope not deviating from the concept or purpose of the present invention, it can be easily understood that a person skilled in the art can change the concrete construction described in the embodiment.

In the construction described hereinafter, the same reference is commonly used to the same part or the part having similar faculty between different figures and there will be a case that overlap explanation is omitted.

In the present description, notation such as "the first, "the second", "the third" and the like is used so as to distinguish components with each other, thus such notation is not necessarily used to limit number or order. Further, the number to distinguish the component is used every context and the number used in one context does not necessarily indicate the same construction in the other context. Furthermore, it is not disturbed that the component distinguished by some number serves the faculty of component distinguished by the other number.

There will be a case that a position, size, shape, range and the like of each construction in figures does not represent the real position, size, shape, range, in order to easily understand the invention. Therefore, the present invention is not necessarily limited to the position, size, shape, range and the like described in figures.

The component represented by singular form in the present description includes plural form so long as not especially clarified in context.

Example 1

In Example 1, it will be described one method example that it is produced a program figure in which the function judged divisible is highlighted for visualization object source code including a plurality of functions. Although a plural kinds of program figures will be conceivable, the calling relation figure of function is basically described as the program figure in the present example.

Figure 1:
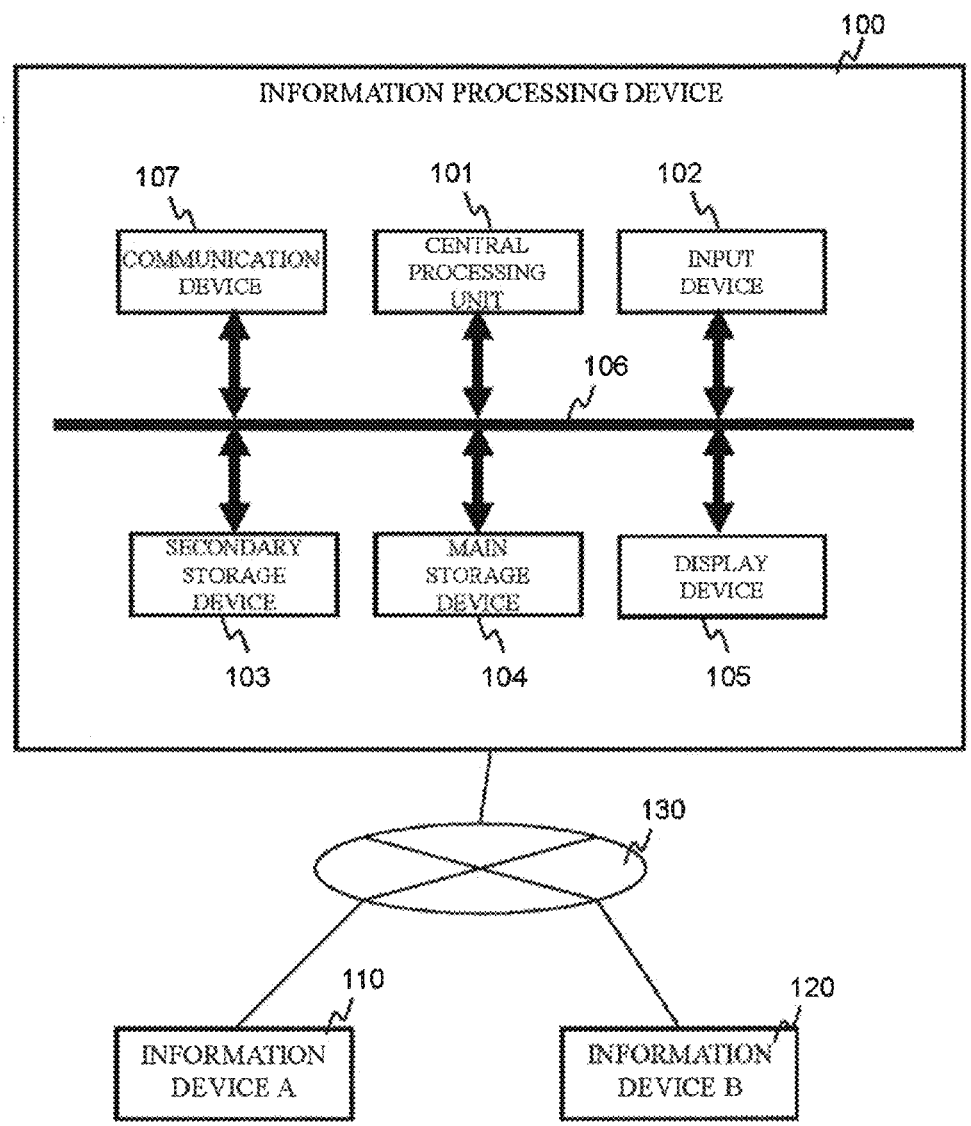
FIG. 1 is a block diagram indicating an example of hardware in Example.

FIG. 1 is a figure indicating one example of hardware of an information processing device 100 and system construction according to Example 1. As the hardware of information processing device 100, a central processing unit 101, an input device 102 such as keyboard or mouse, a secondary storage device 103, a main storage device 104, a display device 105 such as display and a communication device 107. Here, each device is mutually connected by a bus 106, and transmission and reception of data can be mutually conducted among devices. Further, other than the information processing device 100, there exist various information device A110 and information device B120 capable of storing data such as information processing device or network storage and these devices are connected by, for example, the communication network 130 such as internet and the like.

Figure 2:
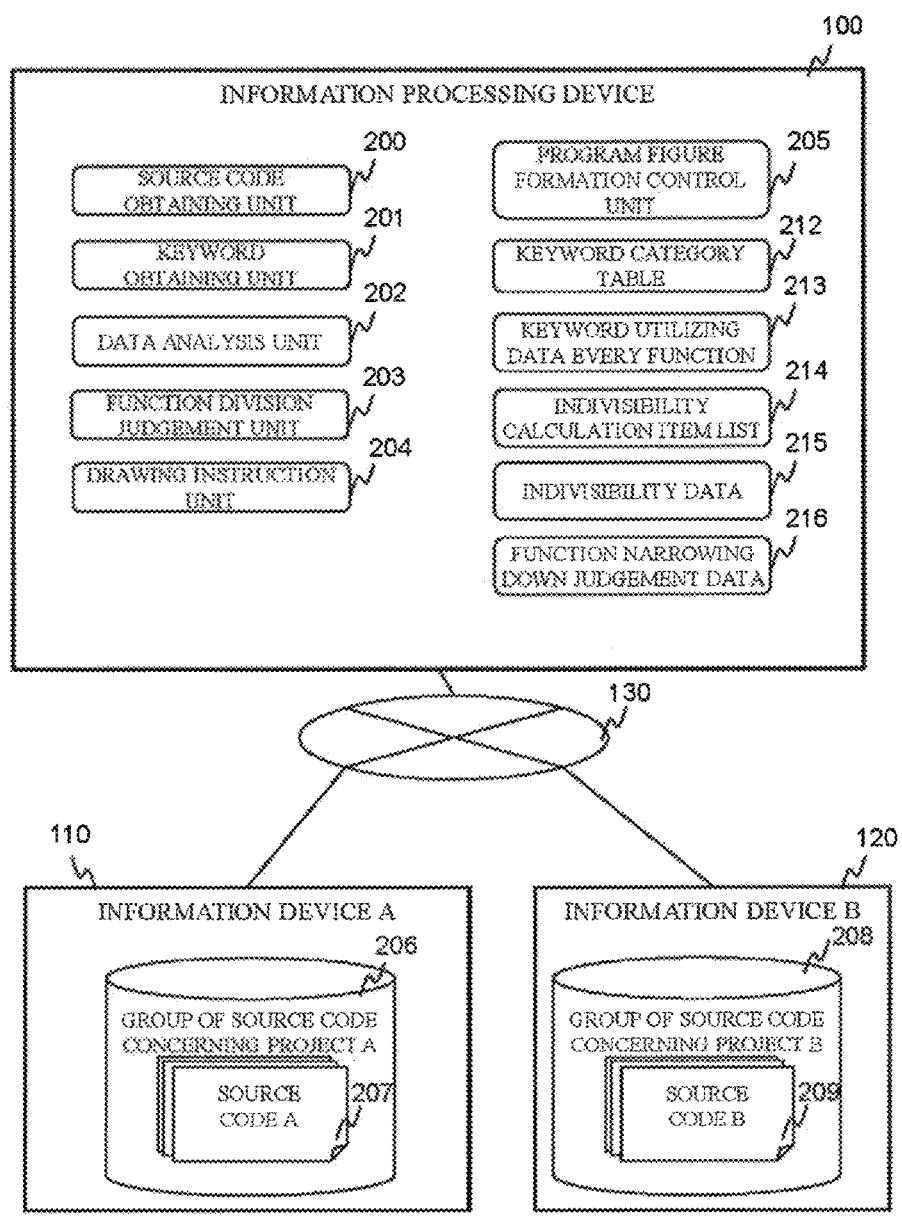
FIG. 2 is a faculty block diagram indicating an example in Example.

FIG. 2 is a figure indicating one example of faculty block diagram of the information processing device 100, the information device A110 and the information device B120. Here, in the present example, it is explained as all of faculty blocks of the information processing device 100 are software program and data executed or operated by the central processing unit 101, a part or all may be realized as hardware.

Further, inherently in addition to the above faculty blocks, although there exist OS (Operating System) and control program and the like to start and manage each of function blocks, in the present example, cooperation movement of these faculty blocks will be voluntarily described, and since it is obvious that OS and the control program conduct start and every function management of faculty blocks necessary for cooperation movement voluntarily described in the above, explanation of these OS and the control program will be omitted.

Here, the information processing device 100 according to Example 1 of the present invention has, shown in FIG. 2 as faculty blocks, a source code obtaining unit 200, a keyword obtaining unit 201, a data analysis unit 202, a function division judgement unit 203, a drawing instruction unit 204, a program figure formation control unit 205, a keyword category table 212, a keyword utilizing data 213 every function, an indivisibility calculation item list 214, indivisibility data 215 and function narrowing down judgement data 216.

The information device A110 has source code group 206 concerning project A and source code A207. The source code 207 is constructed from a partial program such as functions and variables.

The information device B120 has source code group 208 concerning project B and source code B209. The source code B209 is constructed from a partial program such as functions and variables. Here, the source code group 206 concerning project A, the source code A207, the source code group 208 concerning project B and the source code 209 are not necessarily stored in the above mentioned places, thus may be stored in any of the information processing device 100, the information device A110, the information device B120 and the other accessible information processing device.

In FIG. 3, one example of the keyword category table 212 is shown. In the keyword category table 212, a keyword 3001 described within the faculty and a faculty name 3002 to which the keyword belongs are stored. In the embodiment, as the keyword, SCI0, SCI1, ITU and CMT are described. Further, the function name to which SCI0 and SCI1 belong is described as "communication", and the faculty name to which ITU and CMT belong is described as "timer". The keyword category table 212 may be made by soft vendor. Alternatively, the keyword category table 212 may be made by a software user by categorizing the keywords. These keywords or faculty names are utilized when the keyword obtaining unit 201 obtains macro or keyword information which are set by the source code or the developing• maintenance data concerning the source code and such information is stored in the keyword utilizing data 213 every function. The information stored in the keyword utilizing data 213 every function will be described hereinafter.

In FIG. 4, it is shown one example of the keyword utilizing data 213 every function. In the keyword utilizing data 213 every function, it is, for example, stored data 4002 concerning use of keyword 3001 every function 4001, the data 4002 being included in the source code group concerning project A of the information device A. In the present example, the keyword obtaining unit 201 describes the use number of times of the keyword 3001 described in the keyword category table 212 every function. As for the use number of times of the keyword, a plurality of count methods will be conceivable such that one count is conducted by a sentence unit in which the keyword is used or one count is conducted in a case that the keywords are used in y times during x linage. These count processes can be automatically done by searching and extracting the keyword shown in the keyword category table 212 for the source code of each function. Here, as for the stored data, any data can be stored without being limited to the use number of times of the keyword. Here, it will be conceivable that the stored data are determined beforehand in the system, and further it will be conceivable that the stored data are flexibly determined based on the information input by a user. Further, in the present example, although data of the use number of times are stored by the keyword 3001 unit, it will be conceivable that such data are stored by the faculty 3002 unit without being limited to the keyword unit.

In FIG. 5, it is shown an example of the indivisibility calculation item list 214. In the indivisibility calculation item list 214, there are stored an item 5001 utilized in the indivisibility calculation, an indivisibility calculation method 5002 of the item 5001 and an indivisibility threshold value 5003 of the item 5001.

In the present example, the item 5001 utilized in the indivisibility calculation is selected by a user. By utilizing the indivisibility calculation method 5002 stored in the indivisibility calculation item list 214 (FIG. 5) and the data stored in the keyword utilizing data 213 every function (FIG. 4), the indivisibility of the indivisibility calculation item 5001 selected by the user is calculated and the calculated indivisibility is stored in the indivisibility data 215 (FIG. 6).

The calculated indivisibility is used when it is judged whether or not the function becoming the function division judgement object is divisible. In the present example, as the example of the indivisibility calculation item 5001, it is raised "concerning degree of faculty" and "ratio of utilizing order of faculty".

The "concerning degree of faculty" (concerning degree of faculty A and faculty B) is calculated by dividing the number of faculty using the keyword belonging to the faculty A and keyword belonging to the faculty B by the number of function utilizing the keyword belonging to the faculty A or the keyword belonging to the faculty B.

The "ratio of utilizing order of faculty" (ratio according to which the faculty B is utilized after the faculty A) is calculated by dividing the number of function utilizing the faculty B after the faculty A by the number of function utilizing the faculty B after the faculty A or the number of function utilizing the faculty A after the faculty B.

As for the "concerning degree of function" and the "ratio of utilizing order of faculty" which are the indivisibility calculation item 5001, the values 0.7 and 0.5 are respectively described as the threshold values 5003. In the present example, as the indivisibility calculation item, the "concerning degree of faculty" is used. In a case that the function uses the faculty A, the faculty B, the faculty C, the indivisibility is respectively calculated for the faculty A and the faculty B, the faculty B and the faculty C and the faculty A and the faculty C. Further, it is judged divisible when the function utilizes the faculty that all of the calculated indivisibilities are lower than the threshold value. Here, the item utilized in the indivisibility calculation is not limited to utilization one by one and it is conceivable that a plurality of items are simultaneously utilized.

The indivisibility calculation item list 214 shown in FIG. 5 is set and made beforehand. The example of calculation method is not limited to FIG. 5 and it will be enough that the calculation method can appreciate association or closeness of faculties each other. In the example shown in FIG. 5, although indivisibility of two faculties is calculated as the calculation method, it will be conceivable that indivisibility of faculties more than three is calculated. For example, in a case that association of three faculties A, B and C is calculated, association of three faculties A, B and C can be calculated by [(number of function utilizing the keyword concerning the faculty A, the keyword concerning the faculty B and the keyword concerning the faculty C)/(number of function utilizing the keyword concerning the faculty A or the keyword concerning the faculty B or the keyword concerning the faculty C)]. It is similar in a case that the faculty is more than 4 (four). Further, although the threshold value is set beforehand, it may be conceivable that the threshold value can be changed or selected when the indivisibility is calculated, as described hereinafter.

In FIG. 6, it is shown an example of the indivisibility data 215 calculated by the indivisibility calculation method shown in FIG. 5 based on the keyword utilizing data 213 every function shown in FIG. 4. In the indivisibility data 215, it is stored a calculated value of the indivisibility calculation item 5001 which is instructed to utilize by the user. The calculation method of the indivisibility is as same as the method explained according to FIG. 5. In the present example, it is assumed a case that the utilized indivisibility calculation item is the "concerning degree of faculty" and the value of indivisibility 6001 is stored in a table form through which the concerning degree among faculties is representable. In the example shown in FIG. 5, it is shown the concerning degree of the category A (communication faculty) and the category B (timer faculty). Further, in the example shown in FIG. 5, although the calculated value is gathered and shown every category, such value can be also shown every keyword. Here, storing form or display form of the calculated value is not limited to the above, and it will be conceivable that the calculated value can be stored and displayed according to a voluntary form.

In FIG. 6, although only two faculties of timer and communication are indicated, as explained hereinafter, the indivisibility data of FIG. 6 are obtained concerning the combination of all faculties (there will be a case having faculties more than three) utilized in the judgement object function in the judgement whether or not the function is divisible.

In FIG. 7, it is shown an example of the function narrowing down judgement list 216. In the function narrowing down judgement list 216, it is raised an item 7001 utilized to narrow down the function division judgement object function. When a number of the function division judgement object function is enormous, it takes a long time to finish the division judgement of all division judgement object functions. Therefore, the number of the judgement object function is narrowed down by utilizing the function narrowing down judgement list 216, thereby the judgement time is shortened. By utilizing the judgement condition of FIG. 7, the function suitable for the examination object of the function division can be extracted.

In the present example, as the item 7001, there are raised "utilizing faculty/keyword number", "faculty/maximum number of the space between the lines existing between the keywords", "LOC", "complex degree", "correction number of times", "period elapsed from the last correction" and "number of people concerning development" and the user can utilize favorite items. The function narrowing down judgement list 216 is set beforehand based on law learned by experience. For example, the function with many correction number of times has complex construction, thus there will be many cases that it is better to divide such function. Further, the function with many people concerning development has complex construction, thus there will be many cases that it is better to divide such function. For each item, a threshold value 7002 is set. When the value of item is larger than the threshold value, the function becomes the division judgement object, and when the value of item is lower than the threshold value, the function is excluded from the division judgement object. Here, of course, the item capable of utilizing in the function narrowing down is not limited to the above items.

Figure 8:
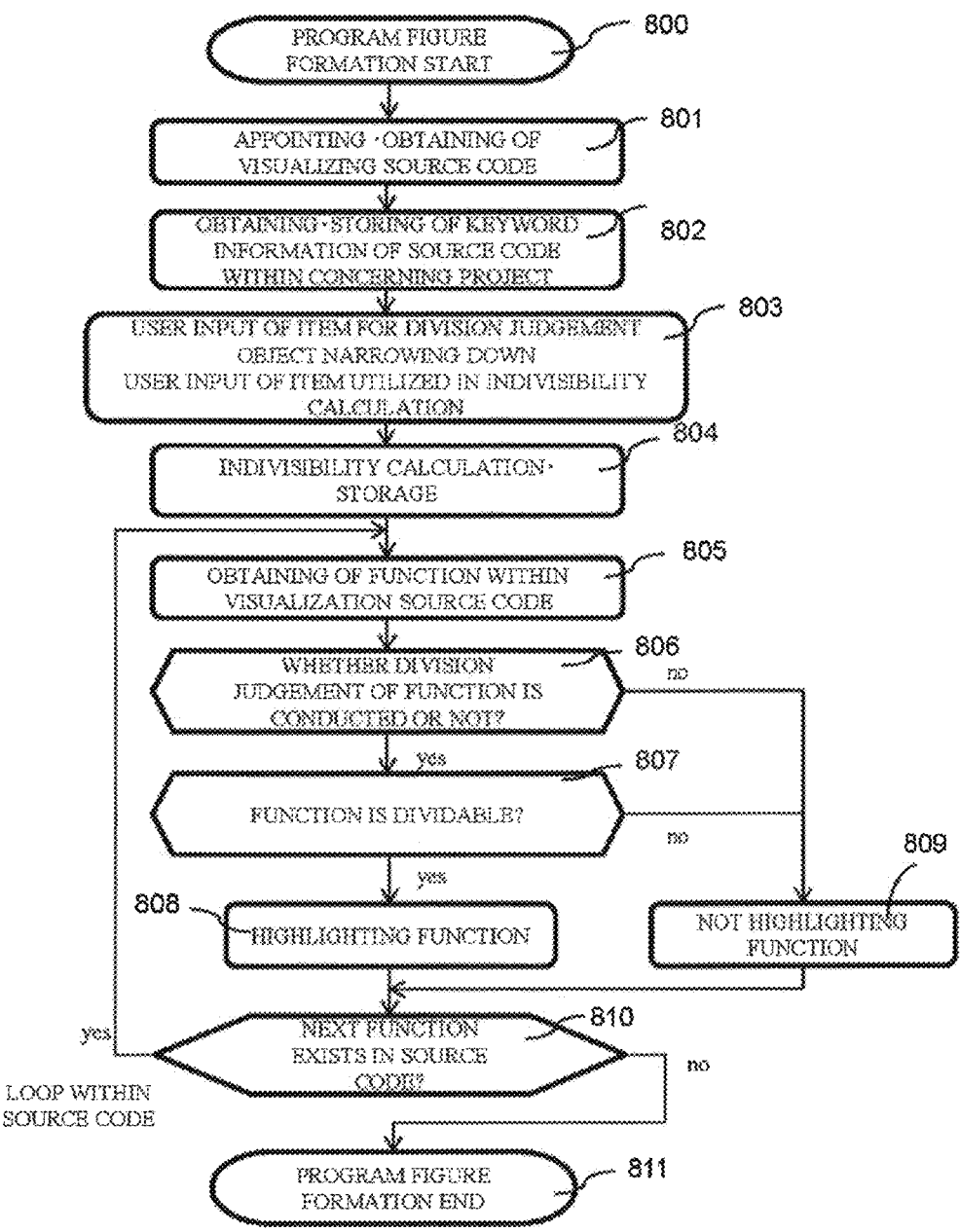
FIG. 8 is a flowchart indicating an example of program figure formation flowchart to assist function division in Example.

In FIG. 8, in order to assist the function division in the information processing device 100, it is shown a flowchart which is one example when the source code A207 (see FIG. 2) stored in the information processing device A110 is visualized.

Process 800: the program figure formation control unit 205 starts the program figure formation. In Example 1, it is indicated an example that it is judged for the function during programming thereof whether the function is divisible or not and it is formed the program figure in which the divisible function is displayed so as to highlight such function.

Process 801: the user appoints the source code which is visualized among the source code group 206 by using the input device 102. In the present example, the source code A207 is appointed as the visualized source code. When the user appoints the source code becoming the visualized object source code, the source code obtaining unit 200 obtains the source code A207 becoming the visualized object among the source code group 206 concerning the project A through the communication device 107. In a case that it will take a long time to search the source code A207 due to that the source code group 206 is huge, it is conceivable that the file seeming to use is moved to a place where high speed search can be done, for example, the information processing device 100 or copied beforehand based on the user's appointment.

Process 802: the keyword obtaining unit 201 obtains the keyword information of macro and the like which is set in the source code group 206 concerning the project A to which the visualized object source code A207 appointed by the user in the process 801 belongs and stores the keyword information in the keyword utilizing data 213 (see FIG. 4) every function.

In the present example, the utilizing number of keyword is stored every function. At that time, it is conceivable that such utilizing number is stored in the keyword utilizing data 213 every function referring keyword classification by the keyword category table 212 (see FIG. 3). Thereby, for example, as relation between the keyword SCI0 and communication, namely the faculty to which the keyword belongs, data can be stored by taking broad concept of the keyword into consideration.

Here, in the present example, although it is raised macro keyword described in the source code as the keyword obtained by the keyword obtaining unit 201, it is not limited to that. Further, as the object to obtain the keyword, it is not limited to the source code group 206 concerning the project A to which the visualized object source code A207 belongs, it can be utilized various source codes such as the source code group 208 concerning the project B to which the source code B209 without relation to the visualized object belongs or developing•maintenance data concerning the source code.

Process 803: the user appoints the item to narrow down the division judgement object function by using the input device 102 and the "indivisibility of faculty" item calculated to judge whether the function is divided hereinafter or not. It is conceivable that the item utilizable in narrowing down of the division judgement object function is described in the function narrowing down judgement list 216 (see FIG. 7) beforehand and the user appoints the item from the function narrowing down judgement list 216.

Further, it is conceivable that the item utilizable in the indivisibility calculation is described in the function indivisibility calculation item list 214 (see FIG. 5) beforehand and the user appoints the item from the function indivisibility calculation item list 214. In the present example, there are described "utilizing faculty/keyword number", "faculty/maximum number of the space between the lines existing between the keywords", "LOC", "complex degree", "correction number of times", "period elapsed from the last correction" and "number of people concerning development" in the function narrowing down judgement list 216 and it is assumed that the user appoints the "utilizing faculty/keyword number" as the narrowing down item in the process 803.

Further, in the indivisibility calculation list 214, two of "concerning degree of faculty" and "ratio of utilizing order of faculty" are described as the indivisibility calculation item 5001 and it is assumed that the user appoints the "concerning degree of faculty" in the process 803. Here, as for the narrowing down item or the indivisibility calculation item, a plurality of items can be simultaneously utilized without limiting utilization one by one.

Process 804: the data analysis unit 202 calculates the indivisibility of the indivisibility calculation item which the user selects by utilizing the indivisibility calculation method stored in the indivisibility calculation item list 214 (see FIG. 5) and the data stored in the keyword utilizing data 213 every function (see FIG. 4) and stores the indivisibility in the indivisibility data 215 (see FIG. 6). This indivisibility is used hereinafter in the judgement whether or not the function is divided. In the process 803, since it is assumed that the user appoints the "concerning degree of faculty" as the "indivisibility" item, the indivisibility is calculated by using the calculation equation of the "concerning degree of faculty" described in the indivisibility calculation list 214.

The "concerning degree of faculty" is an index indicating how closeness characteristics a plurality of faculties have, and according that this value (index) becomes high, it indicates that these faculties are apt to be simultaneously utilized. In other words, when the "concerning degree of faculty" is high, these faculties are to be simultaneously utilized as one process, thus these faculties are indivisible as the process. According to the indivisibility calculation item list 214 (FIG. 5), "concerning degree of the faculty A and the faculty B" can be calculated by dividing the number of function utilizing the keyword belonging to both the faculty A and the faculty B by the total number of function utilizing the keyword belonging to faculty A or the keyword belonging to the faculty B.

Process 805: in processes after the process 805, division judgement is conducted for the function included in the source code A207 which is visualization object. The program figure formation control unit 205 obtains one function as the function division judgement object function among functions included in the source code A207 which is visualization object obtained in the process 801 and for which function division judgement is not conducted yet.

Process 806: the function division judgement unit 203 judges whether or not the division judgement of the function division judgement object function obtained in the process 805. In the present judgment, it is assumed that the "utilizing faculty/number of keyword" is utilized among items described in the function narrowing down judgement list 216. When the judgement is "YES", procedure shifts to process 807. When the judgement is "NO", procedure shifts to process 809. Here, the present process will be explained hereinafter.

Process 807: the function division judgement unit 203 judges whether or not the function is divisible. In the present judgement, it is assumed that the "concerning degree of faculty" is utilized among items described in the indivisibility calculation item list 214 (FIG. 5). In the judgement, the data value of the "concerning degree of faculty" and the threshold value of item of "concerning degree of faculty" described in the indivisibility calculation item list 214 are compared each other. For example, when all of the "concerning degree of faculty" exceed the threshold value, it is judged that the function is indivisible (division is inappropriate). In the example of FIG. 6, the concerning degree of faculty "communication" and faculty "timer" is 0.8, and when the faculties to be appreciated are only these two faculties, the concerning degree exceeds the threshold value 0.7, therefore it is judged that this function is indivisible (NO). Further, although it is not shown in FIG. 6, when the other faculty (for example, "I/O") exists and the concerning degree of the faculty "I/O" and the faculty "timer" is lower than the threshold value, it is judged that the function is dividable (YES). When judged "YES", procedure shifts to process 808. When judged "NO", procedure shifts to process 809. Here, contents of the present process will be described hereinafter. In the above example, although the threshold value is one, it may be conceivable that the threshold value is individually set corresponding to combination of faculties and the result judged every combination of faculty is logically calculated.

Process 808: the drawing instruction unit 204 highlights to display that the function is dividable function. Further, at that time, it may be displayed the faculty or keyword which is lower than the threshold value.

Process 809: the drawing instruction unit 204 does not highlight since the function is not divisible function.

Process 810: the program figure formation control unit 205 judges whether or not it exists the function for which the function division judgement is not done in the source code A207 obtained in step 801. When the function for which the function division judgement is not done exist, procedure shifts to process 805. When the function for which the function division judgement is not done does not exist, procedure shifts to process 811.

Process 811: the program figure formation control unit 205 finishes the program figure formation.

Figure 9:
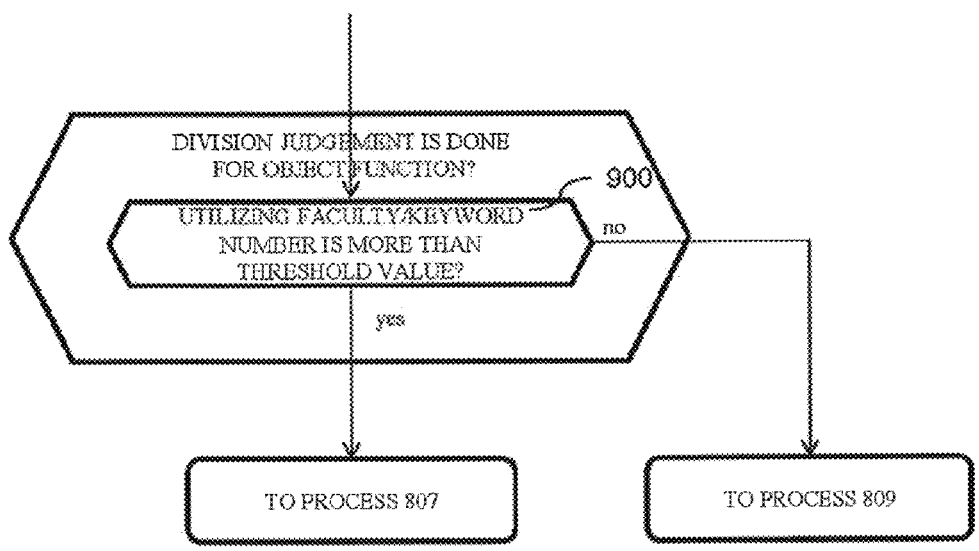
FIG. 9 is a flowchart indicating an example of narrowing down flowchart of function becoming division judgement object in Example.

In FIG. 9, it is shown a flowchart of one example in which it is judged whether or not the function division judgement is done in the process 806 of FIG. 8. In the process 803, it is assumed that the user appoints "utilizing faculty/number of keyword" among the items described in the function narrowing down judgement list 216 (FIG. 7) as the narrowing down item of the division judgement object function. In this example, although singe item is utilized as condition, a plurality of items can be utilized.

Process 900: the data analysis unit 202 analyzes the number of the faculty or keyword used in the function. Further, the function division judgement unit 203 compares the "utilizing faculty/number of keyword" with the threshold value of "utilizing faculty/number of keyword" item described in the function narrowing down judgement list 216. When the former value exceeds the latter value, procedure shifts to process 807. When the former value is lower than the latter value, procedure shifts to process 809.

Figure 10:
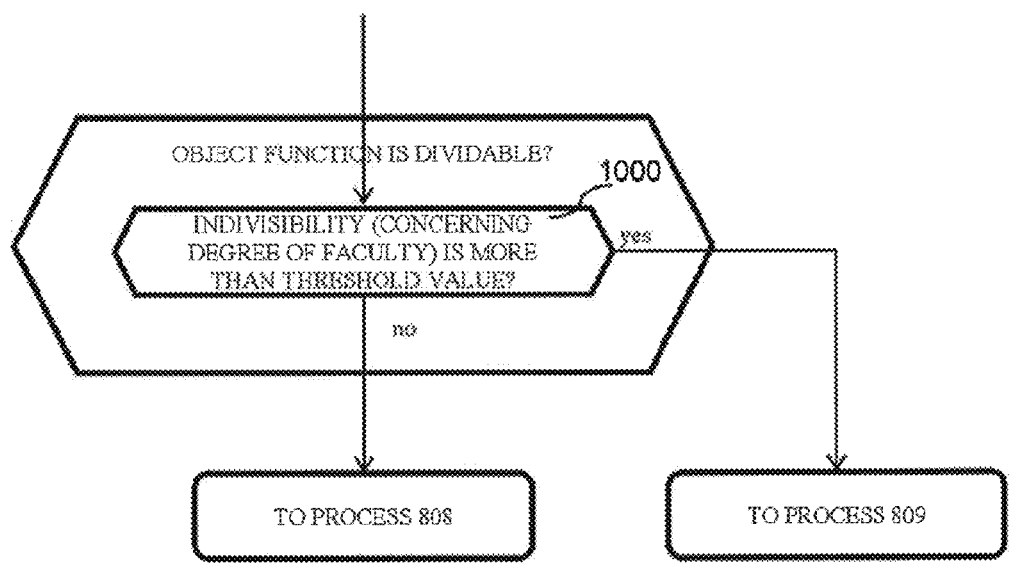
FIG. 10 is a flowchart indicating an example of function division judgement flowchart in Example.

In FIG. 10, it is shown a flowchart of one example in which the function division judgement is done in process 807 of FIG. 8. In the process 803, it is assumed that the user appoints the "concerning degree of faculty" among the items described in the indivisibility calculation item list 214 (FIG. 5) as the "indivisibility" item. In this example, although one item is utilized as condition, a plurality of items can be utilized.

Process 1000: the data analysis unit 202 obtains the keyword data of the judgement object function from the keyword utilizing data 213 (FIG. 4). Further, by utilizing such data, the data analysis unit 202 obtains the "concerning degree of faculty" data value described in the indivisibility data 215 (FIG. 6) for all faculty combinations utilized in the function. Further, for all of the faculties utilized in the function, the function division judgement unit 203 compares the "concerning degree of faculty" data value with the threshold value of the "concerning degree of faculty" item described in the indivisibility calculation item list 214 (FIG. 5). At that time, when the all former values are lower than the latter value exists, procedure shifts to process 808. When the faculty that all former values are lower than the latter value does not exist, procedure shifts to process 809.

As the effect of the present example, the problem existing in PTL 1 mentioned above, that is, it can be dissolved the problem that the function is not analyzed, thus division of the function cannot be done and the source readability cannot be improved. That is to say, by paying attention to the faculty utilized in the function, the concerning degree among faculties is calculated and these are utilized as the function indivisibility. Thereby, the object function is automatically judged whether or not such function can be divided, and by using the judgement result, the program figure in which the divisible function is highlighted is formed and displayed. As a result, assistance to improve the source readability can be conducted.

In the program figure formed by using the method of the present example, by changing the threshold value of the indivisibility, the function highlighted as the divisible function can be changed.

Figure 11:
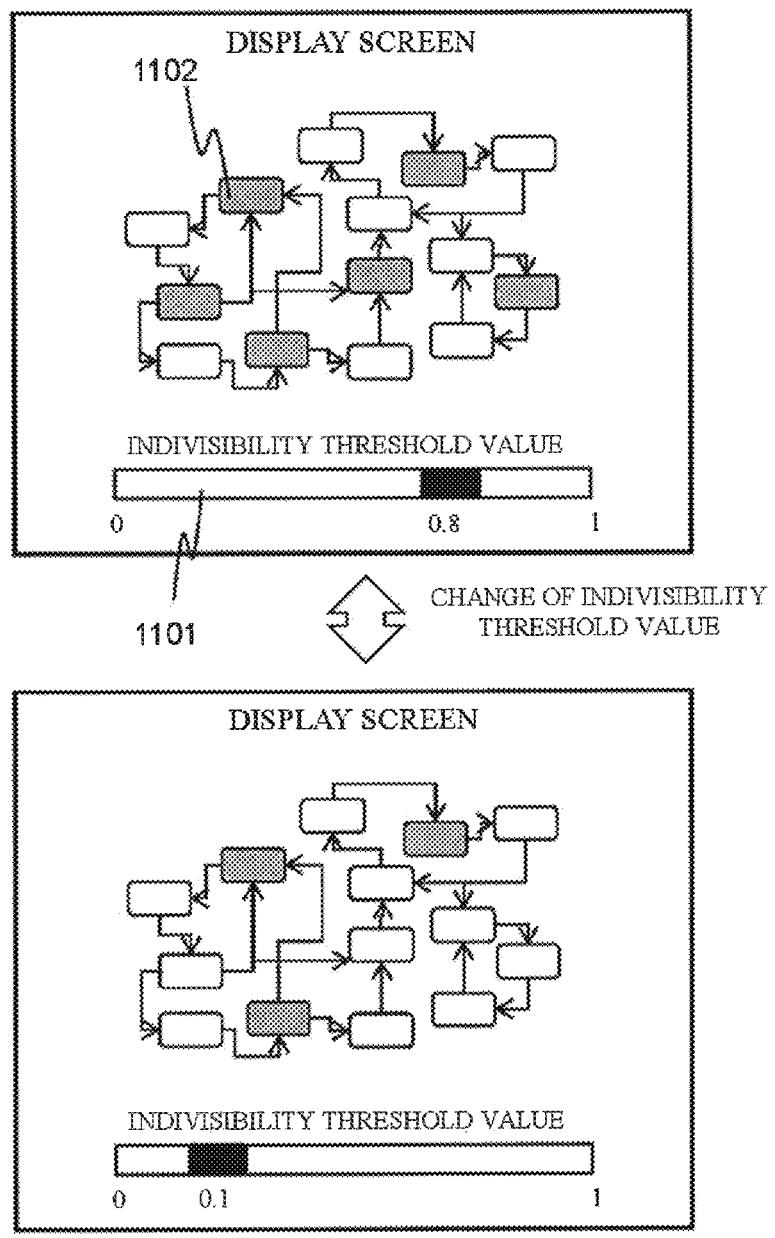
FIG. 11 is a plan view indicating an example in which visualization view changes corresponding to indivisibility change.

In FIG. 11, it is shown a figure example when the threshold value of the indivisibility is changed. For example, a square in FIG. 11 shows a function and an arrow connecting the squares shows summons or notes. Corresponding to a purpose or intention to utilize the present program figure, way of thinking for how dividable functions are included is different. Thus, for example, instead of the threshold value 5003 of the indivisibility calculation item 5001 described in the indivisibility calculation item list 214 (FIG. 5), in a case that a value prepared by an indivisibility threshold value slider 1101 is utilized as the threshold value as shown in FIG. 11, it is conceivable that the program figure is voluntarily converted corresponding to a purpose or intention.

In the program figure shown in FIG. 11, a gray node 1102 indicates the function which is judged divisible. As shown in the upper figure of FIG. 11, when the indivisibility threshold value is 0.8, six functions are highlighted as divisible. However, when the indivisibility threshold value is changed to 0.1 by operating the indivisibility threshold value slider, as shown in lower figure of FIG. 11 only three functions are highlighted as divisible.

In the function division judgement done in the process 1000 or FIG. 11, in a case that among the faculties utilized in the function the faculty (separation object faculty) in which the concerning degree to the other faculty within the function is lower than the threshold value exists more than one, it is judged that such function is divisible. Here, there will be a case that it is better to narrow down the divisible functions to the functions with high division priority when many functions judged to be divisible exist.

Figure 12:
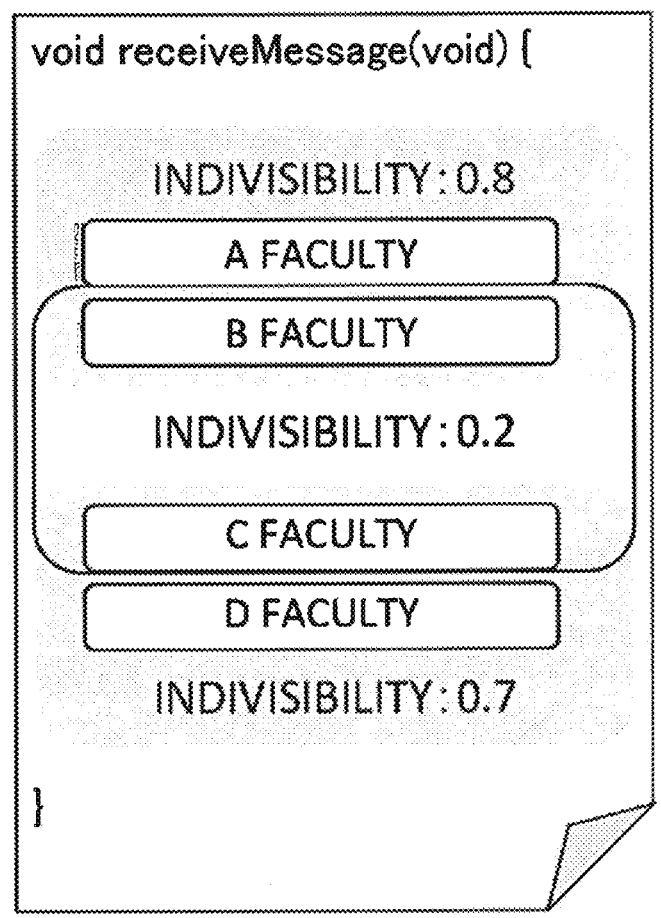
FIG. 12 is a plan view of an example in which function has high division priority.

In FIG. 12, it is shown one example of the function with high division priority. The function (receiveMessage function) shown in FIG. 12 utilizes the A faculty, the B faculty, the C faculty and the D faculty and the indivisibility between the A faculty and the B faculty is 0.8, the indivisibility between the A faculty and the C faculty is 0.2, the indivisibility between the A faculty and the D faculty is 0.2, the indivisibility between the B faculty and the C faculty is 0.2, the indivisibility between the B faculty and the D faculty is 0.2 and the indivisibility between the C faculty and the D faculty is 0.7. As shown in the above, the functions that a plurality of faculty combinations (A faculty and B faculty, C faculty and D faculty) are bipolarized (multipolarized) have high division priority. Next, it will be described an example that the functions in which faculties are bipolarized are extracted.

In FIG. 13, it is shown an example in which the threshold value of indivisibility is changed. In order to analyze the case in FIG. 12, for example as shown in FIG. 13, it is preferable that more than two indivisibility threshold value sliders are provided. By providing more than two indivisibility threshold value sliders, the first threshold value to select a faculty combination with high indivisibility and the second threshold value to separate faculty combinations with high indivisibility can be set. In FIG. 13, the upper indivisibility threshold value slider 1101*a* is used to select the faculty combination with high indivisibility. Based on the threshold value of the upper slider 1101*a*, it is extracted the function in which more than one faculty combination with the indivisibility exceeding the threshold value within the function exists. The lower indivisibility threshold value slider 1101*b* is utilized to separate the faculty combinations with high indivisibility. Based on the threshold value of the lower slider 1101*b*, it is extracted among the functions extracted by the upper slider 1101*a* the function in which more than one faculty combination with the indivisibility lower than the threshold value within the function exists. That is to say, by using the upper slider 1101*a* it is understood that the faculty combination with high indivisibility exists within the function. Further, by using the lower slider 1101*b*, it is understood that the faculty combination with low indivisibility exist within the function. That is, within such function, it is understood that functions are bipolarized (or multipolarized). By using these two sliders, the function having the faculty combination with high indivisibility is first selected, and further the function in which the divisible faculty combination exists is selected among the above selected functions.

It will be explained by using the function in FIG. 12. When the upper slider 1101*a* is set as shown in FIG. 13, as the faculty with high indivisibility, it is understood that the faculty with more than 0.6, that is, the faculty combination of the A faculty and the B faculty and the faculty combination of the C faculty and D faculty exist. Thus, the functions with such faculty can be extracted. In the upper figure of FIG. 13, in a case that more than one faculty combination with the indivisibility more than 0.6 exists, such functions are indicated by white squares and the other functions are indicated by gray squares. However, since the lower slider 1101*b* is set to 0, although the concerning degree between the combination of the A faculty and the B faculty and the combination of the C faculty and the D faculty (concerning degree of the B faculty and the C faculty) is a small value of 0.2, such functions do not become the separation object function. Therefore, the functions not becoming the separation object are indicated by white squares in the upper figure of FIG. 13. Further, the functions indicated by the gray squares means the function in which the faculty combination with the indivisibility more than 0.6 is nothing.

Here, the indivisibility threshold value is set to 0.25 by operating the lower slider 1101*b*. The judgement object by the threshold value of the lower slider 1101*b* is limited to the function (indicated by white squares in FIG. 13) having the faculty combination with indivisibility more than 0.6 by setting of the upper slider. Then, among the functions indicated by white square in the upper figure of FIG. 13, it is extracted the function having the faculty combination with the indivisibility lower than 0.25. In the function shown in FIG. 12, since the indivisibility 0.2 of the B faculty and the C faculty is lower than the threshold value, such function becomes the separation object function. In the lower figure of FIG. 13, some of the functions indicated by white square in the upper figure of FIG. 13 are changed to gray square. These functions changed from white square to gray square are the functions in which the faculty is bipolarized (multipolarized).

In the above explanation, the judgement object of the threshold value of the lower slider is set to the indivisibility among all faculties. However, it may be narrowed down to the indivisibility between the combination of the A faculty and the B faculty and the combination of the C faculty and the D faculty, these faculties having high indivisibility extracted by the upper slider. By specifying the faculty (keyword) to judge, detailed examination can be done. Further, in the example shown in FIG. 13, threshold values of two sliders may be set as effective threshold values only for the indivisibility of the specified faculties each other from a beginning. For example, with no relation to the result set by the upper slider 1101*a*, the lower slider can be set as the threshold value against the indivisibility between the faculty B and the faculty C in FIG. 12.

In the division judgement of functions, as the indivisibility of faculty, ratio of utilizing order of faculty can be utilized. When a plurality of faculties are utilized, there will be a case in which utilizing order of faculty is determined beforehand such that the A faculty is utilized and thereafter the faculty B is utilized. According to the example in FIG. 12, the indivisibility will be explained based on assumption that the indivisibility corresponds to "ratio of utilizing order of faculty". Ratio that the A faculty is utilized and thereafter the B faculty is utilized or C faculty is utilized and thereafter the D faculty is utilized is respectively 0.8 and 0.7. Further, ratio that the B faculty is utilized and thereafter the C faculty is utilized is 0.2. Here, as shown in the lower figure of FIG. 13, when the indivisibility threshold value is set, the indivisibility of the A faculty and the B faculty and the indivisibility of the C faculty and the D faculty are more than threshold value 0.6, therefore these faculties are sorted as the faculty combination with high indivisibility within the function. Further, the indivisibility of the B faculty and the C faculty is lower than the threshold value 0.25, thus the combination of the A faculty and the B faculty and the combination of the C faculty and the D faculty becomes division object.

In the present example, since the program figure is described based on the summons relation figure of function, as shown in FIGS. 11 and 13, the function itself which is judged divisible is highlighted and function inside is not represented. However, it is conceivable that the function inside which is judged divisible is desirably visualized. At that time, for example, as described in FIG. 12, it is conceivable visualization method that combination of the indivisible faculties is colored within the function. Of course, the visualization method is not limited to that described in the present example including the above method.

Here, in the present example, although the indivisibility is utilized according whether or not the function is highlighted, various utilizing methods can be conceivable without being limited to the above method.

The present invention is not limited to the embodiment and various modifications are included. For example, it can be done that a part of one example is substituted with the construction in the other example and that the construction of the other example is added to the construction of one example. Further, as for a part of the construction in each example, the construction in the other example can be added, deleted and substituted.

INDUSTRIAL APPLICABILITY

The present invention can be adapted for the device in which software is operated such as incorporation device and the like.

REFERENCE SIGNS LIST 100 information processing device,
101 central processing unit,
102 input device,
103 secondary storage device,
104 main storage device,
105 display device,
106 bus,
107 communication device,
110 information device A,
120 information device B,
130 communication network,
200 source code obtaining unit,
201 keyword obtaining unit,
202 data analysis unit,
203 function division judgement unit,
204 drawing instruction unit,
205 program figure formation control unit,
206 source code group concerning project A,
207 source code A,
208 source code group concerning project B,
209 source code B,
212 keyword category table,
213 keyword utilizing data every function,
214 indivisibility calculation item list,
215 indivisibility data,
216 function narrowing down judgement data.

The invention claimed is:

1. A module division assistance device having an input device, an output device, an arithmetic device and a storage device, the module assistance device dividing a module in a source code,
wherein the arithmetic device can utilize a keyword category table and an indivisibility calculation item list stored in the storage device or input from the input device,
wherein the keyword category table includes a plurality of data combinations each of which has a keyword and a category corresponding to the keyword,
wherein the indivisibility calculation item list includes a combination of an indivisibility calculation item between a first category and a second category within the above category and information concerning a calculation method of the indivisibility calculation item,
wherein the arithmetic device possesses a source code obtaining unit, a keyword obtaining unit, a data analysis unit and a module division judgement unit,
wherein the source code obtaining unit obtains a group of source code and a source code becoming a visualization object, stored in the storage device or input from the input device,
wherein the keyword obtaining unit specifies the keyword included in the module every module in the group of source code and forms a keyword utilizing data every module,
wherein the data analysis unit calculates the indivisibility for the first category and the second category by utilizing the calculation method stored in the indivisibility calculation item list, the data stored in the keyword utilizing data every module and the information concerning the category corresponding to the keyword included in the keyword category table and forms indivisibility data, and
wherein the module division judgement unit specifies the keyword existing within each module in the source code becoming the visualization object and specifies the module having a combination of keywords corresponding to the first category and the second category having the indivisibility lower than a predetermined threshold value in each module.

2. The module division assistance device according to claim 1,
wherein the category is a faculty name that the keyword concerns, and
wherein the data analysis unit calculates a concerning degree between the first category and the second category or a ratio of utilizing order of the first category and the second category as the indivisibility.

3. The module division assistance device according to claim 1,
wherein the module division judgement unit utilizes a threshold value input from the input device or a threshold value accompanying a combination of each information of the indivisibility calculation item list as the predetermined threshold value.

4. The module division assistance device according to claim 1,
wherein the module division judgement unit judges the module dividable when all of the indivisibilities between the categories corresponding to the keyword included in one module within each module in the source code becoming the visualization object are lower than the predetermined threshold value, and judges the module indivisible in cases other than the above case.

5. The module division assistance device according to claim 1,
wherein it is utilizable a module narrowing down judgement list defining a narrowing down condition to narrow down the module in the source code becoming the visualization objet, and wherein the module division judgement unit conducts a process to specify the module for the module corresponding to the narrowing down condition.

6. A module division assistance method dividing a module in a source code by utilizing an input device, an output device, an arithmetic device and a storage device, wherein the arithmetic device can utilize a keyword category table and an indivisibility calculation item list stored in the storage device or input from the input device, wherein the keyword category table includes a plurality of data combinations each of which has a keyword and a category corresponding to the keyword, wherein the indivisibility calculation item list includes a combination of an indivisibility calculation item between a first category and a second category within the above category and information concerning a calculation method of the indivisibility calculation item, wherein the arithmetic device possesses a source code obtaining unit, a keyword obtaining unit, a data analysis unit and a module division judgement unit, wherein the source code obtaining unit obtains a group of source code and a source code becoming a visualization object, stored in the storage device or input from the input device, wherein the keyword obtaining unit specifies the keyword included in the module every module in the group of source code and forms a keyword utilizing data every module, wherein the data analysis unit calculates the indivisibility for the first category and the second category by utilizing the calculation method stored in the indivisibility calculation item list, the data stored in the keyword utilizing data every module and the information concerning the category corresponding to the keyword included in the keyword category table and forms indivisibility data, and wherein the module division judgement unit specifies the keyword existing within each module in the source code becoming the visualization object and specifies the module having a combination of keywords corresponding to the first category and the second category having the indivisibility lower than a predetermined threshold value in each module.

7. The module division assistance method according to claim 6, wherein the category is a faculty name that the keyword concerns, and wherein the data analysis unit calculates a concerning degree between the first category and the second category or a ratio of utilizing order of the first category and the second category as the indivisibility.

8. The module division assistance method according to claim 6, wherein the module division judgement unit utilizes a threshold value input from the input device or a threshold value accompanying a combination of each information of the indivisibility calculation item list as the predetermined threshold value.

9. The module division assistance method according to claim 6, wherein the module division judgement unit judges the module dividable when all of the indivisibilities between the categories corresponding to the keyword included in one module within each module in the source code becoming the visualization object are lower than the predetermined threshold value, and judges the module indivisible in cases other than the above case.

10. The module division assistance method according to claim 6, wherein it is utilizable a module narrowing down judgement list defining a narrowing down condition to narrow down the module in the source code becoming the visualization objet, and wherein the module division judgement unit conducts a process to specify the module for the module corresponding to the narrowing down condition.

11. A module division assistance program for controlling an information processing device having an input device, an output device, an arithmetic device and a storage device to execute a process to divide a module in a source code, wherein the arithmetic device can utilize a keyword category table and an indivisibility calculation item list stored in the storage device or input from the input device, wherein the keyword category table includes a plurality of data combinations each of which has a keyword and a category corresponding to the keyword, wherein the indivisibility calculation item list includes a combination of an indivisibility calculation item between a first category and a second category within the above category and information concerning a calculation method of the indivisibility calculation item, wherein the arithmetic device possesses a source code obtaining unit, a keyword obtaining unit, a data analysis unit and a module division judgement unit, wherein the source code obtaining unit obtains a group of source code and a source code becoming a visualization object, stored in the storage device or input from the input device, wherein the keyword obtaining unit specifies the keyword included in the module every module in the group of source code and forms a keyword utilizing data every module, wherein the data analysis unit calculates the indivisibility for the first category and the second category by utilizing the calculation method stored in the indivisibility calculation item list, the data stored in the keyword utilizing data every module and the information concerning the category corresponding to the keyword included in the keyword category table and forms indivisibility data, and wherein the module division judgement unit specifies the keyword existing within each module in the source code becoming the visualization object and specifies the module having a combination of keywords corresponding to the first category and the second category having the indivisibility lower than a predetermined threshold value in each module.

12. The module division assistance device according to claim 11, wherein the category is a faculty name that the keyword concerns, and wherein the data analysis unit calculates a concerning degree between the first category and the second category or a ratio of utilizing order of the first category and the second category as the indivisibility.

13. The module division assistance device according to claim 11, wherein the module division judgement unit utilizes a threshold value input from the input device or a threshold value accompanying a combination of each information of the indivisibility calculation item list as the predetermined threshold value.

14. The module division assistance device according to claim 11,
wherein the module division judgement unit judges the module dividable when all of the indivisibilities between the categories corresponding to the keyword included in one module within each module in the source code becoming the visualization object are lower than the predetermined threshold value, and judges the module indivisible in cases other than the above case.

15. The module division assistance device according to claim 11,
wherein it is utilizable a module narrowing down judgement list defining a narrowing down condition to narrow down the module in the source code becoming the visualization objet, and
wherein the module division judgement unit conducts a process to specify the module for the module corresponding to the narrowing down condition.

\* \* \* \* \*